(12) United States Patent
Rolly

(10) Patent No.: US 8,227,524 B2
(45) Date of Patent: Jul. 24, 2012

(54) INKJET INK COMPOSITION

(75) Inventor: Luanne J. Rolly, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 712 days.

(21) Appl. No.: 11/510,350

(22) Filed: Aug. 25, 2006

(65) Prior Publication Data

US 2008/0049086 A1  Feb. 28, 2008

(51) Int. Cl.
*C09D 11/00* (2006.01)

(52) U.S. Cl. ............ 523/160; 347/100; 106/31.86; 106/31.89; 106/31.28

(58) Field of Classification Search .......... 523/160, 523/161
See application file for complete search history.

(56) References Cited

U.S. PATENT DOCUMENTS

| | | | |
|---|---|---|---|
| 5,156,675 A | 10/1992 | Breton et al. | |
| 5,165,968 A | 11/1992 | Johnson et al. | |
| 5,226,957 A | 7/1993 | Wickramanayake et al. | |
| 5,534,050 A * | 7/1996 | Gundlach | 106/31.49 |
| 5,835,116 A * | 11/1998 | Sato et al. | 347/98 |
| 5,900,899 A * | 5/1999 | Ichizawa et al. | 347/100 |
| 6,264,731 B1 | 7/2001 | Gundlach et al. | |
| 6,471,757 B1 | 10/2002 | Koitabashi et al. | |
| 6,540,821 B2 * | 4/2003 | Adamic et al. | 106/31.48 |
| 6,827,433 B2 | 12/2004 | Takemoto et al. | |
| 2004/0129344 A1 | 7/2004 | Arita et al. | |
| 2005/0090599 A1 | 4/2005 | Spinelli | |
| 2005/0139124 A1 * | 6/2005 | Ito et al. | 106/31.58 |
| 2005/0176847 A1 | 8/2005 | Cagle | |
| 2006/0092251 A1 | 5/2006 | Prasad et al. | |
| 2006/0098066 A1 | 5/2006 | Bauer | |
| 2008/0165235 A1 * | 7/2008 | Rolly et al. | 347/100 |

FOREIGN PATENT DOCUMENTS

| | | |
|---|---|---|
| EP | 1 142 967 A2 * | 3/2001 |
| EP | 1 811 002 A | 7/2007 |
| WO | 2005/028576 A | 3/2005 |
| WO | 2005/090495 A | 9/2005 |
| WO | 2006/030930 A | 3/2006 |
| WO | 2006/030978 A | 3/2006 |
| WO | 2006-083000 A | 8/2006 |
| WO | 2007/046542 A | 4/2007 |

\* cited by examiner

*Primary Examiner* — Doris Lee

(57) ABSTRACT

An inkjet ink composition includes from about 3 wt. % to about 8 wt. % of a solvent selected from diacetone alcohol, 2,3-butanediol, 1,3,5-trioxane, hexylene glycol, and combinations thereof. The composition further includes from about 0.5 wt. % to about 1 wt. % of 1,2-hexanediol; from about 0.1 wt. % to about 2.0 wt. % of a fluorosurfactant; from about 3 wt. % to about 6 wt. % of a pigment; a dispersant; and water.

18 Claims, No Drawings

INKJET INK COMPOSITION

BACKGROUND

The present disclosure relates generally to inkjet ink compositions.

Thermal inkjet printers use resistors to create heat, which in turn vaporizes ink to form a bubble. As the bubble expands, some of the ink is pushed out of the nozzle. A vacuum is created when the bubble collapses, which pulls more ink from the cartridge into the print head.

Inks that are predominantly water-based generally may not perform well in thermal ink jet printers. Poor performance may result because rapid water evaporation often leads to poor nozzle reliability (i.e., a crust of dried ink may clog the nozzle due to rapid water evaporation).

Predominantly non-aqueous solvent-based inks (i.e., inks made with solvents having a higher vapor pressure than water) generally have faster dry times than aqueous inks on non-absorbent substrates, due, at least in part, to higher vapor pressure and smaller latent heat of evaporation values. Non-aqueous solvent-based inks may, however, be undesirable. This may be due, at least in part, to the amount of volatile organic compounds that may be present in such inks; the potentially high volatility of such inks; and/or the potential incompatibility of such inks with adhesives and polymers. Non-aqueous solvent-based inks may also limit the materials suitable for constructing the printhead, as some of the solvents may be capable of ruining the print head.

Combination aqueous- and solvent-based inks for drop-on-demand inkjet printing generally include enough of a low vapor pressure/high boiling point solvent to assist in controlling nozzle reliability. As the water in these inks evaporates, the solvents tend to remain in the firing chamber in order to keep the colorants and other materials in the ink solubilized. However, the quantity of solvent generally used to achieve nozzle reliability may not evaporate readily, thereby increasing dry times on non-absorbent substrates.

DETAILED DESCRIPTION

Embodiments of the inkjet ink composition disclosed herein are predominantly aqueous-based inks that are suitable for thermal and piezoelectric inkjet printing. The inkjet ink composition disclosed herein advantageously exhibits good smudge and/or abrasion resistance, enhanced decap performance, good nozzle health, better drop formation and ejection than inks based on water alone, and has a decreased dry time (i.e., unassisted drying (e.g., air drying)) when printed on non-absorbent media.

The term "decap," as referred to herein, means the ability of the inkjet ink to readily eject from the print head, upon prolonged exposure to air. The ink decap time is measured as the amount of time that an ink printhead may be left uncapped before the printer nozzles no longer fire properly, potentially because of clogging or plugging. Generally, the nozzle(s) may become clogged/plugged by a viscous plug that forms in the nozzle(s) as a result of water loss, crusting of the ink, and/or crystallization of the dye in and/or around any of the nozzles. If a nozzle has plugged, ink droplets ejected through the nozzle's orifice may be misdirected, which may adversely affect print quality. The orifice may also become completely blocked, and as a result, the ink droplets may not pass through the affected nozzle.

Without being bound to any theory, it is believed that the combination of a relatively large amount of water and a small amount of specific solvents in the ink aids in achieving good nozzle health, good decap performance, and reliable drop formation/ejection, substantially without deleteriously impacting the dry time of the ink on non-absorbent media. It is further believed that the interaction between the specific solvents and the dispersant aids in achieving good smudge and/or abrasion resistance.

An embodiment of the inkjet ink composition includes 1,2-hexanediol; a solvent; a fluorosurfactant; a pigment; a dispersant; and water. In other embodiments, the inkjet ink composition also includes a dye.

Generally, 1,2-hexanediol is present in the ink composition in an amount ranging from about 0.5 wt. % to about 1 wt. %. Without being bound to any theory, it is believed that after the ink composition is fired and the nozzle is idle, the relatively small amount of 1,2-hexanediol is capable of concentrating at the air-ink interface in the nozzle. It is believed that this may be due, at least in part, to the fact that the 1,2-hexanediol is considered a quasi-surfactant having a hydrophilic end and a hydrophobic end. It is further believed that this substantially reduces the rate at which water loss occurs; thereby substantially preventing crusting of the nozzle and enhancing decap performance and nozzle reliability.

In an embodiment, the total solvent concentration in the ink composition ranges from about 3 wt. % to about 8 wt. %. As such, if a combination of solvents is present, the total amount is equal to or less than about 8 wt. %. The solvent is selected from diacetone alcohol, 2,3-butanediol, 1,3,5-trioxane, hexylene glycol, and combinations thereof. Non-limiting examples of solvents or solvent combinations include about 1 wt. % hexylene glycol and about 4 wt. % 2,3-butanediol; about 8 wt. % diacetone alcohol; or about 5 wt. % 2,3-butanediol. It is believed that the small amount of solvent(s), in combination with the 1,2-hexanediol, advantageously assists in maintaining nozzle health without negatively impacting the dry time of the ink. Furthermore, it is believed that the small amount of solvent(s) achieves reliable drop formation and ejection.

The fluorosurfactant is present in an amount ranging from about 0.1 wt. % to about 2.0 wt. %. In an embodiment, about 1.0 wt. % of the fluorosurfactant is present in the ink composition. Non-limiting examples of suitable fluorosurfactants are Zonyl® FSO (an ethoxylated non-ionic fluorosurfactant commercially available from Dupont located in Wilmington, Del.), Zonyl® FSA (a water soluble lithium carboxylate anionic fluorosurfactant commercially available from Dupont), Zonyl® FSN (a non-ionic fluorosurfactant commercially available from Dupont), Zonyl® FSP (a water-soluble, anionic phosphate fluorosurfactant commercially available from Dupont), Novec® 4430 (a fluorosurfactant commercially available from 3M located in St. Paul, Minn.), Novec® 4432 (a non-ionic fluorosurfactant commercially available from 3M), Novec® 4434 (a water-soluble non-ionic fluorosurfactant commercially available from 3M), Polyfox® 136A (an anionic water dispersible fluorosurfactant commercially available from OMNOVA Solutions Inc., located in Chester, S.C.), Polyfox® 151N (a non-ionic water dispersible fluorosurfactant commercially available from OMNOVA Solutions Inc.), and Polyfox® 156A (an anionic water dispersible fluorosurfactant commercially available from OMNOVA Solutions Inc.). Without being bound to any theory, it is believed that the fluorosurfactant aids in substantially preventing the printed ink from beading (which may increase dry time and reduce legibility) on non-absorbent substrates.

The inkjet ink composition also includes a pigment. Generally, the amount of pigment ranges from about 2 wt. % to about 6 wt. %. The pigments may be non-ionic, cationic, anionic, and/or combinations thereof.

As used herein, the term "pigment" refers to a colorant particle that is substantially insoluble in the liquid vehicle in which it is used. Suitable pigments include self-dispersed pigments and non-self-dispersed pigments. Self-dispersed pigments include those that have been chemically modified at the surface with a charge or a polymeric grouping. This chemical modification aids the pigment in becoming and/or substantially remaining dispersed in a liquid vehicle. A non-self-dispersed pigment utilizes a separate and unattached dispersing agent (e.g., polymers, oligomers, surfactants, etc.) in the liquid vehicle or physically coated on the surface of the pigment.

Some non-limiting examples of suitable pigments include pigment black 1, pigment red (PR) 122, pigment yellow (PY) 74, pigment blue (PB) 15:4, or combinations thereof.

In an embodiment, the pigment is a self-dispersible anionic pigment. A pigment precursor is chemically modified to impart water-dispersibility to the precursor. Such modifications include the incorporation of carboxylate and/or sulfonate functionalities. In an embodiment, the anionic pigments are associated with $Na^+$, $Li^+$, $K^+$, and $NH_4^+$ cations, although any suitable counter-ion may be used herein. A non-limiting example of a self-dispersible pigment is CAB-O-JET 300, which is commercially available from Cabot Corporation located in Boston, Mass.

Examples of suitable black pigments include Raven 7000, Raven 5750, Raven 5250, Raven 5000, and Raven 3500 (all of which are commercially available from Columbian Chemicals, Co. located in Marietta, Ga.). Other examples of suitable black pigments include Color Black FW 200, Color Black FW 2, Color Black FW 2V, Color Black FW 1, Color Black FW 18, Color Black S 160, Color Black S 170, Special Black 6, Special Black 5, Special Black 4A, and Special Black 4 (all of which are commercially available from Degussa Corp. located in Parsippany, N.J.).

Many colored pigments are capable of being modified via the attachment of organic group(s). Suitable classes of colored pigments include, but are not limited to anthraquinones, phthalocyanine blues, phthalocyanine greens, diazos, monoazos, pyranthrones, perylenes, heterocyclic yellows, quinacridones, and (thio)indigoids. Non-limiting examples of phthalocyanine blues include copper phthalocyanine blue and derivatives thereof (e.g., PB15). Examples of quinacridones include, but are not limited to pigment orange (PO) 48, PO49, PR122, PR192, PR202, PR206, PR207, PR209, pigment violet (PV) 19, PV42, or combinations thereof. Non-limiting examples of anthraquinones include PR43, PR194 (perinone red), PR216 (brominated pyrathrone red), PR226 (pyranthrone red), or combinations thereof. Perylene pigment examples include, but are not limited to PR123 (vermillion), PR149 (scarlet), PR179 (maroon), PR190 (red), PR189 (yellow shade red), PR224, or combinations thereof. Non-limiting examples of thioindigoids include PR86, PR87, PR88, PR181, PR198, PV36, PV38, or combinations thereof. Examples of suitable heterocyclic yellow pigments include, but are not limited to PY117, PY138, or combinations thereof. Examples of other suitable colored pigments are described in Colour Index, 3rd edition (The Society of Dyers and Colourists, 1982). The pigments listed herein are examples of suitable pigments; however, it is to be understood that other pigments may be suitable for embodiments of the inkjet ink composition.

An embodiment of the ink composition includes a dispersant. The dispersant may aid in dispersion of the pigment. It is believed that the dispersant also interacts with the specific solvents, resulting in enhanced abrasion/smudge resistance. Generally, the dispersant is present in an amount ranging from about 0.4 wt. % to about 0.6 wt. % of the weight of the pigment. One class of dispersants suitable for use in embodiments of the ink composition includes those having a molecular skeleton of a styrene/acrylic acid copolymer resin. Generally, the dispersant has an acid number greater than or equal to 100, and a molecular weight equal to or less than 20,000. Specific examples of suitable dispersants include those manufactured by BASF Corp., located in Florham Park, N.J., under the tradenames Joncryl 680 (molecular weight 4,900, acid value 215), Joncryl 682 (molecular weight 1,700, acid value 238), Joncryl 586 (molecular weight 4,600, acid value 108), Joncryl 683 (molecular weight 8,000, acid value 160), Joncryl 678 (molecular weight 8,500, acid value 215), Joncryl 671 (molecular weight 17,250, acid value 214), or combinations thereof.

In an embodiment, the inkjet ink composition also includes a dye. The dyes may be cationic and/or anionic. Non-limiting examples of suitable dyes include acid red 52 Na, acid red 289, acid blue 7, acid blue 9, acid yellow 73, Projet K820, or combinations thereof.

Other examples of suitable dyes include, but are not limited to direct yellow 86; acid red 289; direct blue 41; direct blue 53; direct blue 199; direct black 168; direct yellow 132; the Duasyn® line of dyes available from Clariant located in Coventry, R.I.; direct black 168; reactive black 31; direct yellow 157; reactive yellow 37, acid yellow 23; reactive red 180; direct red 28; acid red 52; acid red 91; acid black 1; acid green 3; acid green 5; acid green 50; direct blue 199; acid blue 1; acid blue 9; acid blue 34; acid blue 90; acid blue 93; acid blue 104; reactive red 4; reactive red 56; acid red 92; or combinations thereof.

Further non-limiting examples of suitable dyes include direct red 227, acid yellow 17, Yellow Shade 16948 (all of which are commercially available from Tricon Colors Inc., located in Elmwood Park, N.J.); Pergasol® Yellow CGP, Orasol® Black RL (Ciba-Geigy), Orasol® Black RLP (all of which are commercially available from Ciba Specialty Chemicals, located in Tarrytown, N.Y.); Levafix® Brilliant Yellow E-GA, Levafix® Yellow E2RA, Levafix® Black EB, Levafix® Black E-2G, Levafix® Black P-36A, Levafix® Black PN-L, Levafix® Brilliant Red E6BA, and Levafix® Brilliant Blue EFFA (all of which are commercially available from DyStar Textilfarben GmbH, located in Frankfurt, Germany); Procion® Turquoise PA, Procion® Turquoise HA, Procion® Turquoise Ho5G, Procion® Turquoise H-7G, Procion® Red MX-5B, Procion® Red H8B (Reactive Red 31), Procion® Red MX 8B GNS, Procion® Red G, Procion® Yellow MX-8G, Procion® Black H-EXL, Procion® Black P-N, Procion® Blue MX-R, Procion® Blue MX-4GD, Procion® Blue MX-G, and Procion® Blue MX-2GN (all of which are commercially available from DyStar Textilfarben GmbH). The dyes listed herein are examples of suitable dyes, however, it is to be understood that other dyes may be suitable for embodiments of the inkjet ink composition.

It is to be understood that the dye may be color matched with the pigment (e.g., magenta dye with magenta pigment). Alternately, the dye and pigment may be different colors (e.g., magenta pigment and a cyan dye).

The dye may be present in an amount ranging from about 0.5 wt. % to about 2 wt. %. It is believed that the dye increases the chroma and saturation of the printed ink on various forms of media, thus enhancing legibility of the printed text.

The balance of the inkjet ink composition may be water. Generally, at least 80% of the ink composition is water.

Forming embodiment(s) of the inkjet ink composition includes providing or making the ink vehicle (i.e., solvents, water, and surfactant), and adding the effective amount of pigment and/or dye thereto.

To further illustrate embodiment(s) of the present disclosure, an example is given herein. It is to be understood that this example is provided for illustrative purposes and is not to be construed as limiting the scope of the disclosed embodiment(s).

EXAMPLE

Three different ink compositions were prepared. Two of the inks (ink formulas 1 and 2) represent embodiments of the present disclosure, and one of the inks (ink formula 3) is a comparative example formed without 1,2-hexanediol and with different solvents. The formulas are shown in Table 1 below.

TABLE 1

Ink Formulations

| Ink Formula 1 | | Ink Formula 2 | | Ink Formula 3 (comparative) | |
|---|---|---|---|---|---|
| Ingredient | Wt. % | Ingredient | Wt. % | Ingredient | Wt. % |
| Diacetone alcohol | 8% | 2,3-butanediol | 3.5% | Trimethylol propane | 10% |
| 1,2-hexanediol | 0.5% | Hexylene glycol | 1% | 2-pyrollidinone | 6% |
| fluorosurfactant | 1.0% | 1,2-hexanediol | 0.5% | 1,5-pentanediol | 4% |
| Self-dispersing magenta pigment | 3.0% | fluorosurfactant | 1.0% | fluorosurfactant | 1% |
| Acid Red 52 | 1% | Self-dispersing magenta pigment | 3.0% | Self-dispersing magenta pigment | 3% |
| Water | 86.5% | Acid Red 52 | 1% | Acid Red 52 | 1% |
| | | Water | 90% | Water | 75% |

In an embodiment of a method for using embodiment(s) of the inkjet ink composition, the ink composition is established on at least a portion of a substrate to form an image. The amount of the ink composition established depends, at least in part, on the desirable image to be formed. The image may include alphanumeric indicia, graphical indicia, or combinations thereof. A non-limiting example of a suitable inkjet printing technique includes thermal inkjet printing or piezoelectric inkjet printing. Suitable printers include portable thermal or piezoelectric inkjet printers (e.g., handheld printers, arm mountable printers, wrist mountable printers, etc.), desktop thermal or piezoelectric inkjet printers, or combinations thereof.

When embodiments of the ink are established on non-absorbent substrate materials, the dry time is equal to or less than about 10 seconds. It is to be understood that the dry time may vary slightly, depending, at least in part, on the font and print density. Examples of suitable non-absorbent substrates (some of which may also be non-porous substrates) include, but are not limited to vinyl and other plastic sheets or films, metals, coated offset media, some wood materials, glass, and/or the like, and/or combinations thereof. Some specific non-limiting examples of such substrates include polypropylene tapes, polyester tapes, polyethylene bags, water-resistant envelopes, aluminum foil, other substrates formed from polyethylenes and/or high-density polyethylenes, and/or combinations thereof.

It is to be understood that embodiments of the inkjet ink composition disclosed herein may also be printed on absorbent substrates. Non-limiting examples of such substrate materials include, but are not limited to plain papers, microporous photopapers, coated papers, glossy photopapers, semi-gloss photopapers, heavy weight matte papers, billboard papers, digital fine art papers, calendared papers, vinyl papers, or combinations thereof.

The ink formulations were printed on a variety of non-absorbent media and on plain paper using a thermal inkjet printer. The unassisted dry time results are depicted in Table 2. The dry time was measured by wiping the printed text with a soft cloth or tissue. The text is printed at a 24 pt font with a dot pattern at 25% depletion.

TABLE 2

Dry Time Results for the Ink Formulations on Different Media

| | Dry Time | | |
|---|---|---|---|
| Test Substrate | Ink Formula 1 | Ink Formula 2 | Ink Formula 3 |
| Aluminum Foil | <10 s | <10 s | >4 hrs |
| Glass | <10 s | <10 s | >4 hrs |
| High density polyethylene (HDPE) | <10 s | <10 s | >4 hrs |
| Low density polyethylene (LDPE) | <10 s | <10 s | >4 hrs |
| biaxially oriented polypropylene tape (BOPP) | <10 s | <10 s | >4 hrs |
| Polyester film | <10 s | <10 s | >4 hrs |
| Polyethylene terephthalate (PET) (e.g., Mylar ®) film | <10 s | <10 s | >4 hrs |
| Tyvek ® Envelope | <1 s | <1 s | <5 s |
| Plain paper | <1 s | <1 s | <1 s |

Generally, "<5 seconds" means that the printed ink smudges when tested at 0-1 seconds, but does not smudge at the 5-6 second point. The "<10 seconds" means that the printed ink smudges at 5 seconds, but does not smudge at the 10 second point. It is to be understood that the times are +/−1 second.

As depicted in Table 2, the dry times for ink formulations 1 and 2 were lower than the dry times for ink formulation 3 when printed on non-absorbent substrates.

While several embodiments have been described in detail, it will be apparent to those skilled in the art that the disclosed embodiments may be modified. Therefore, the foregoing description is to be considered exemplary rather than limiting.

What is claimed is:
1. An inkjet ink composition, comprising:
a solvent being chosen from one of: i) hexylene glycol in combination with 2,3-butanediol, or ii) 2,3-butanediol;
1,2-hexanediol present in an amount ranging from about 0.5 wt. % to about 1 wt. %;

a fluorosurfactant present in an amount ranging from about 0.1 wt. % to about 2.0 wt. %;

a pigment present in an amount ranging from about 2 wt. % to about 6 wt. %;

a dye present in an amount ranging from about 0.5 wt. % to about 2 wt. %;

a dispersant; and water;

wherein the inkjet ink composition is configured to be printable on a non-absorbent substrate, the printed inkjet ink composition on the non-absorbent substrate having a dry time of 10 seconds or less.

2. The inkjet ink composition as defined in claim 1 wherein the substantially non-absorbent substrate is selected from the group consisting of polypropylene tapes, polyester tapes, polyethylene bags, water-resistant envelopes, aluminum foil, glass, polyethylene substrates, high-density polyethylene substrates, and combinations thereof.

3. The inkjet ink composition as defined in claim 1 wherein the solvent is chosen from hexylene glycol in combination with 2,3-butanediol, and wherein about 1 wt % of the hexylene glycol is present in the inkjet ink composition and about 4 wt % of the 2,3-butanediol is present in the inkjet ink composition.

4. The inkjet ink composition as defined in claim 1 wherein the solvent is chosen from 2,3-butanediol, and wherein about 5 wt % of the 2,3-butanediol is present in the inkjet ink composition.

5. The inkjet ink composition as defined in claim 1 wherein the dispersant is present in an amount ranging from about 0.4 wt. % to about 0.6 wt. % of the weight of the pigment.

6. The inkjet ink composition as defined in claim 5 wherein the dispersant is a styrene/acrylic acid copolymer resin.

7. A method for forming an image on a substrate, comprising:

establishing an inkjet ink on at least a portion of the substrate, the inkjet ink including:

a solvent being chosen from one of: i) hexylene glycol in combination with 2,3-butanediol, or ii) 2,3-butanediol;

1,2-hexanediol present in an amount ranging from about 0.5 wt. % to about 1 wt. %;

a fluorosurfactant present in an amount ranging from about 0.1 wt. % to about 2.0 wt. %;

a pigment present in an amount ranging from about 2 wt. % to about 6 wt. %;

a dye present in an amount ranging from about 0.5 wt. % to about 2 wt. %;

a dispersant; and water;

wherein when the inkjet ink is established on a substantially non-absorbent substrate, at least one of: dry time of the inkjet ink is substantially reduced; a surface of the established inkjet ink is substantially smudge resistant; or combinations thereof;

and wherein the printed inkjet ink established on the non-absorbent substrate has a dry time of 10 seconds or less.

8. The method as defined in claim 7 wherein the substantially non-absorbent substrate is selected from polypropylene tapes, polyester tapes, polyethylene bags, water-resistant envelopes, aluminum foil, glass, polyethylene substrates, high-density polyethylene substrates, and combinations thereof.

9. The method as defined in claim 7 wherein the substantially reduced dry time is equal to or less than about 10 seconds.

10. The method as defined in claim 7 wherein establishing is accomplished by thermal inkjet printing or piezoelectric inkjet printing.

11. The method as defined in claim 10 wherein inkjet printing is accomplished using a portable thermal inkjet printer, a desktop thermal inkjet printer, a portable piezoelectric inkjet printer, a desktop piezoelectric inkjet printer, or combinations thereof.

12. A printing system, comprising:

a printer; and an inkjet ink configured to be printed, via the printer, on a substantially non-absorbent substrate, and to have a reduced dry time when printed on the substantially non-absorbent substrate, the reduced dry time being 10 seconds or less, the inkjet ink including:

a solvent being chosen from one of: i) hexylene glycol in combination with 2,3-butanediol, or ii) 2,3-butanediol;

1,2-hexanediol present in an amount ranging from about 0.5 wt. % to about 1 wt. %;

a fluorosurfactant present in an amount ranging from about 0.1 wt. % to about 2.0 wt. %;

a pigment present in an amount ranging from about 3 wt. % to about 6 wt. %;

a dye present in an amount ranging from about 0.5 wt. % to about 2 wt. %;

a dispersant; and water.

13. The system as defined in claim 12 wherein the substantially non-absorbent substrate is selected from polypropylene tapes, polyester tapes, polyethylene bags, water-resistant envelopes, aluminum foil, glass, polyethylene substrates, high-density polyethylene substrates, and combinations thereof.

14. The system as defined in claim 12 wherein when the inkjet ink composition is established on the substantially non-absorbent substrate, a surface of the established inkjet ink composition is substantially smudge resistant.

15. The system as defined in claim 12 wherein the printer is selected from portable thermal inkjet printers, desktop thermal inkjet printers, portable piezoelectric inkjet printers, desktop piezoelectric inkjet printers, and combinations thereof.

16. The system as defined in claim 15 wherein the substantially non-absorbent substrate is selected from polypropylene tapes, polyester tapes, polyethylene bags, water-resistant envelopes, aluminum foil, glass, polyethylene substrates, high-density polyethylene substrates, and combinations thereof.

17. The system as defined in claim 12 wherein the dispersant is present in an amount ranging from about 0.4 wt. % to about 0.6 wt. % of the weight of the pigment.

18. The system as defined in claim 17 wherein the dispersant is selected from a styrene/acrylic acid copolymer resin.

* * * * *